S. RASMUSSEN.
DOUGH RAISER.
APPLICATION FILED NOV. 30, 1908.

929,983.

Patented Aug. 3, 1909.
2 SHEETS—SHEET 1.

Inventor
SUSANNE RASMUSSEN,
Wm Bagger & Co.
Attorneys.

Witnesses
C. E. Smith.
S. L. Burket.

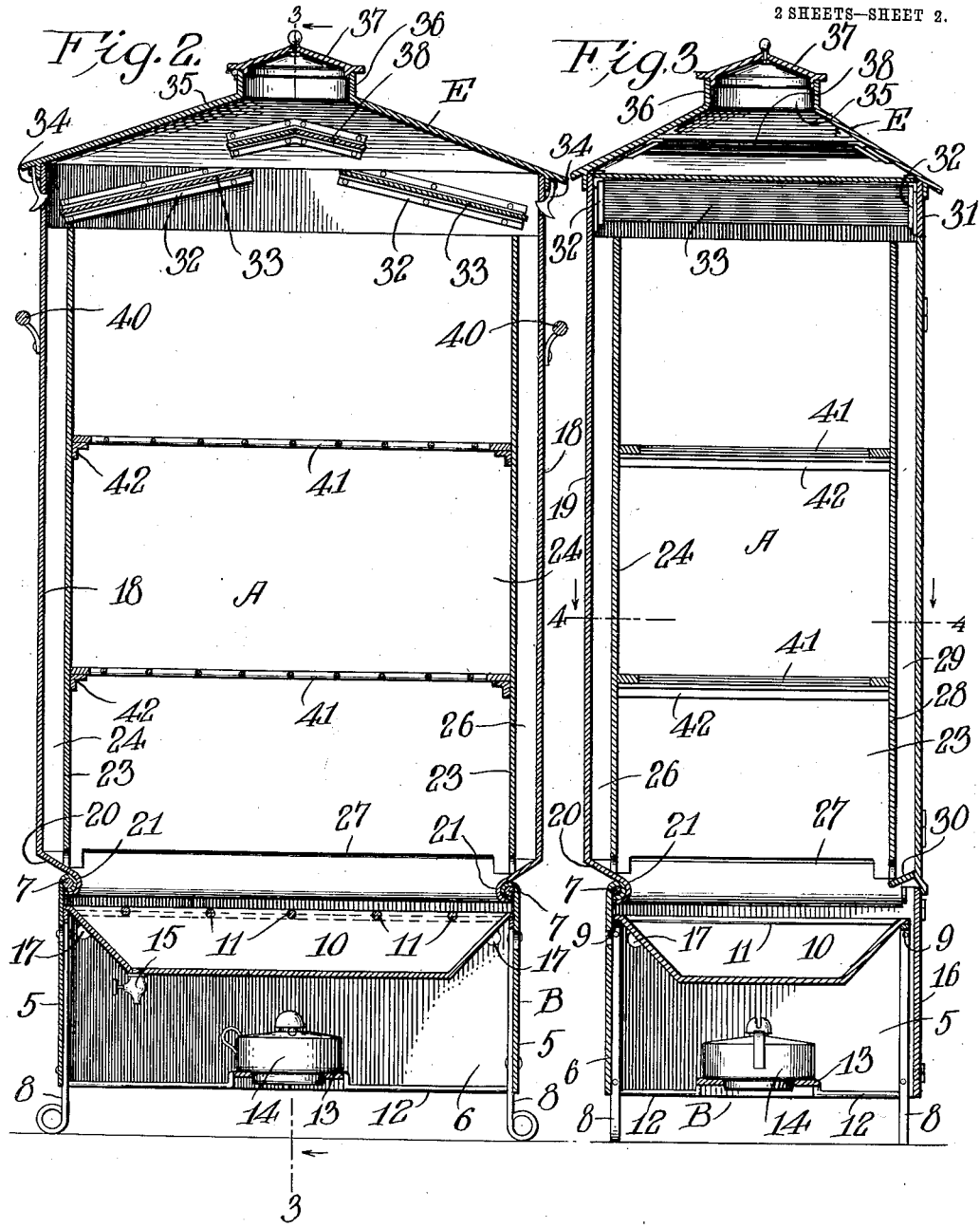

UNITED STATES PATENT OFFICE.

SUSANNE RASMUSSEN, OF SHEFFIELD, ILLINOIS.

DOUGH-RAISER.

No. 929,983.　　Specification of Letters Patent.　　Patented Aug. 3, 1909.

Application filed November 30, 1908. Serial No. 465,351.

*To all whom it may concern:*

Be it known that I, SUSANNE RASMUSSEN, a citizen of the United States, residing at Sheffield, in the county of Bureau and State of Illinois, have invented certain new and useful Improvements in Dough-Raisers, of which the following is a specification.

This invention relates to devices or apparatus for raising dough, and it has special reference to that class of devices which comprise a casing or cabinet equipped with shelves upon which pans or vessels containing dough may be supported, and having a simple heating apparatus whereby the temperature of the interior of such casing or cabinet may be raised to and maintained at the desired degree.

The invention has for its object to simplify and improve the construction and operation of this device; and with these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

Figure 1:
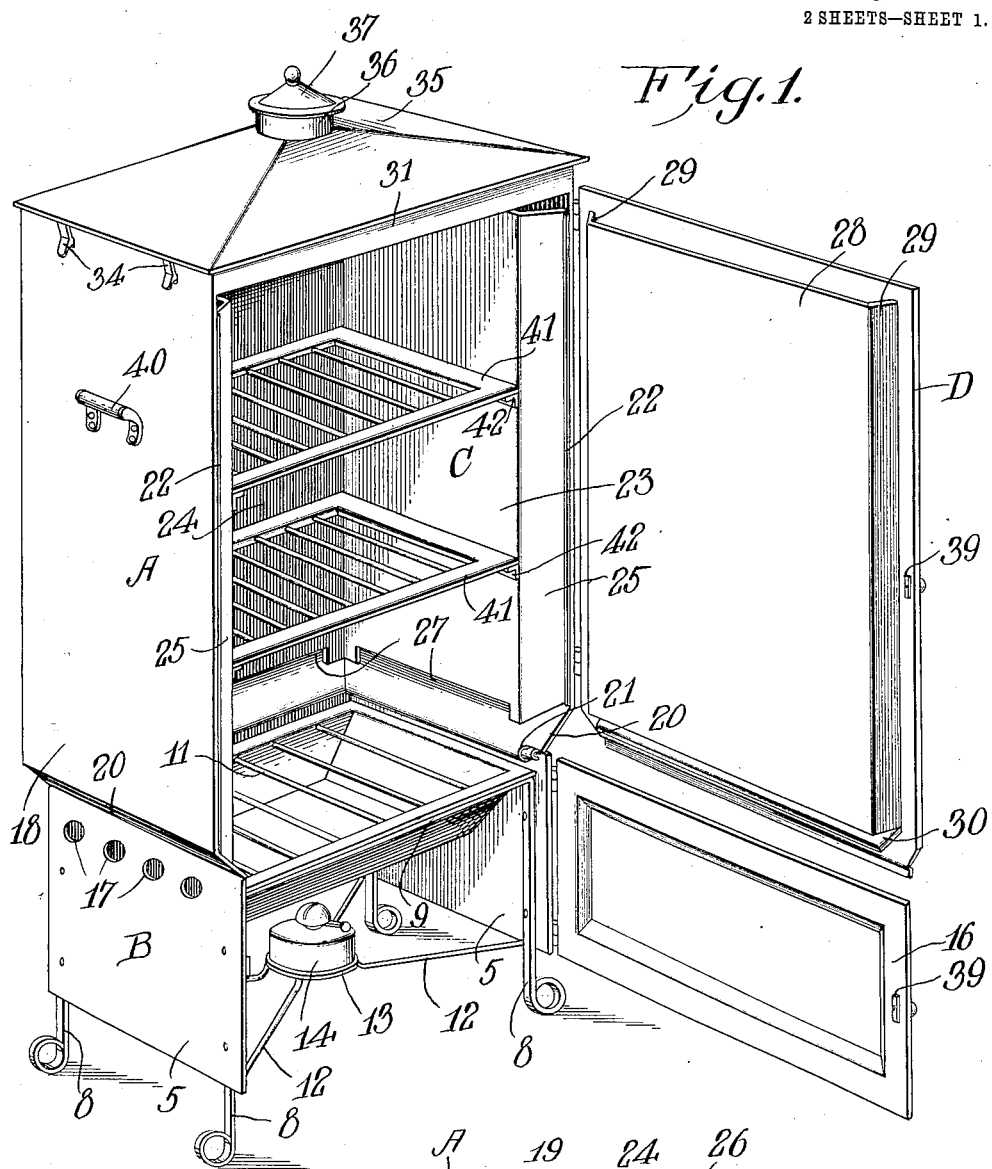
Figure 4:
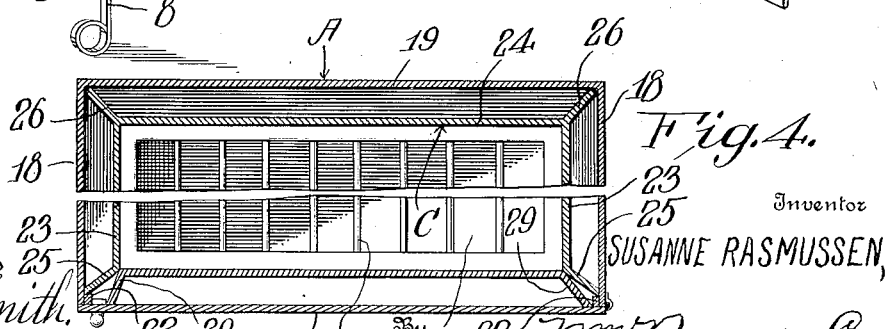

In the drawings—Figure 1 is a perspective view of the improved dough raising cabinet showing the same with the doors open. Fig. 2 is a vertical transverse sectional view of the same. Fig. 3 is a vertical sectional view taken on the plane indicated by the line 3—3, in Fig. 2. Fig. 4 is a horizontal sectional view taken on the plane indicated by the line 4—4 in Fig. 3.

Corresponding parts in the several figures are denoted by like characters of reference.

The casing of the improved cabinet is composed of an upper portion A and a lower portion B. The portion B, is composed of the side walls 5, 5, and the rear wall 6, which may be suitably connected together or manufactured of a single piece of material, such as sheet metal; the upper edges of said side and rear walls being beaded upon the frame 7, of wire or other suitable material. The side walls 5—5 are riveted, bolted or otherwise suitably secured upon the legs or supports 8, which are connected at their upper ends by cross-bars 9, which coöperate to form a horizontal frame which serves to support a water pan or receptacle 10, equipped with cross-bars 11, constituting a grate upon which a pan or receptacle containing dough may be supported. Diagonal bars 12, extending from the legs 8 serve to support a ring 13, upon which a suitably constructed lamp or heater 14, may be placed directly beneath the pan or water receptacle 10, for the purpose of heating the contents of the latter. The pan 10 is provided with a valved drain plug or cock 15, through which its contents may be discharged without removing the pan from its position in the casing. The lower portion of the casing has a front door 16, which is hingedly connected with one of the side walls, and which may be readily opened to afford convenient access to the lamp or heater. The side walls 5 and the rear wall 6, has been shown as provided with ventilating apertures 17 near their upper edges.

The upper portion A of the casing or cabinet is composed of the side walls 18 and the rear wall 19, which may be manufactured from a single piece of material such as sheet metal, or suitably connected with each other: said side walls and rear walls are provided adjacent to their lower ends with inturned flanges 20, having terminal beads 21, externally engaging the beads whereby the side and rear walls of the lower portion of the casing are connected with the rod or frame 7, the side walls 18 are provided adjacent to their front edges with vertical cleats 22 forming supports or abutments for the front edges of an inner casing C, which is composed of the side walls 23 and rear wall 24, the same being formed of a single piece of material, such as sheet metal, or suitably connected along their meeting edges: this inner case is also provided at the front edges of the side walls 23, with flanges 25, adapted to engage or abut upon the cleats 22: the rear corners of the casing C, formed by the meeting edges of the side and rear walls are provided with diagonally extending flanges 26, adapted to engage the rear corners formed by the meeting edges of the side and rear walls of the upper portion A of the outer casing. The side and rear walls 23, 24, of the inner casing C, are provided at their lower edges with notches 27, forming drain apertures.

It will be seen that, under the construction described, the interior casing C, may be bodily removed from the outer casing by sliding it in an upward direction; when properly positioned within the outer casing, the said inner casing is supported upon the inturned flanges 20 at the lower edges of the side and rear walls 18, 19, as will be clearly seen in the drawings.

The upper portion of the casing is provided with a door D, hingedly connected with the front edge of one of the side walls 18; said door is provided upon its inner side with a guard-plate 28, provided at the side edges thereof with flanges 29, whereby it is connected with and spaced from the inner face of the door. The latter is provided near its lower edge with an inclined flange 30, forming a deflector which, when the door is closed, projects inward beyond the upper front edge of the pan or receptacle 10.

The upper edges of the side and rear walls of the interior casing C, terminate some distance below the upper edges of the side and rear walls of the upper portion A of the outer casing, and said side walls 18, of the outer casing are connected at their upper ends by a cross piece or lintel 31; said lintel and the rear wall 19, are provided with cleats or flanges 32, upon which inclined deflectors 33 are removably supported. The upper end of the casing or cabinet is closed by a readily removable cap E, which may be retained in position by suitable catches or latches 34; the cap E, is constructed with a ventilating aperture 35, surrounded by a flange 36, having a removable lid 37; and an inverted V-shaped baffle deflector 38, is arranged in the cap E, below the aperture 35, and above the upper inner ends of the deflectors 33.

The doors of the device are provided with simple fastening devices such as turn-buttons 39, whereby they may be retained in closed position; and the casing is provided with handles 40, whereby it may be readily conveyed from place to place.

From the foregoing description taken in connection with the drawings hereto annexed, the operation and advantages of this invention will be readily understood. By lighting the lamp or heater 14, water contained in the pan or receptacle 10, may be heated and evaporated, thus keeping the interior of the casing or cabinet in a moist and heated state which is favorable to the process of fermentation involved in the raising of dough. The dough may be placed in pans or receptacles upon the grate bars 11, and upon shelves 41, which are detachably supported upon cleats 42, secured upon the side walls 23, to the interior casing C. The humidity of the interior of the casing may be reduced by removing the lid 37, to permit a portion of the moisture laden air to escape; when the lid 37 is in position, the moisture will be condensed upon the deflectors 33 and baffle 38, and the drops of water will be guided into the spaces between the walls of the outer and inner casings A and C as well as into the space between the door D, and the guard plate 28 supported upon the latter, the water being eventually returned over the inclined flanges 20 and 30 into the pan or receptacle 10.

When the improved device is not being utilized for the purpose of raising dough, it will be found to constitute an extremely useful and convenient cabinet for the storage of bread and pastry and for other purposes to which a kitchen cabinet is usually applied.

The interior of the cabinet may be easily kept in a clean and thoroughly sanitary condition, owing principally to the facility with which the interior casing C may be removed, when desired.

Having thus described the invention, what is claimed is:

1. A dough raising cabinet, including a lower portion having a supporting frame provided with legs or uprights, walls secured upon said uprights, a door hingedly connected with one of the walls, a supporting frame attached to the legs, a lamp heater supported upon said frame and a water receptacle supported detachably above the heater; in combination with an upper casing headed upon the upper edges of the walls of the lower casing and having walls spaced from each other to form passages for the return of water of condensation to said receptacle.

2. In a device of the character described, a casing or cabinet having a lower portion and upper portion, the walls of said upper portion being provided with inturned flanges connected with the walls of the lower portion, and the side walls of said upper portion being provided with cleats adjacent to their front edges; a water receptacle and means for heating the contents of said receptacle supported by the lower portion of the casing; an interior casing slidably connected with the upper portion of the cabinet and provided with flanges engaging the cleats adjacent to the front edges of the side walls, and corner flanges engaging the angles between the side and rear walls of the upper portion of the cabinet, the walls of the inner casing being notched at their lower edges; a door hingedly connected with one of the side walls of the upper portion of the casing; a flanged guard plate and an inclined deflector secured upon the inner side of said door; deflectors arranged in the upper portion of the cabinet; and a detachable cap having a vent opening, a lid for the same, and a baffle deflector arranged below the vent opening.

In testimony whereof I affix my signature in presence of two witnesses.

SUSANNE RASMUSSEN.

Witnesses:
W. F. GEUSTER,
A. W. BOYDEN, Jr.